US011475791B2

(12) United States Patent
Simmons et al.

(10) Patent No.: US 11,475,791 B2
(45) Date of Patent: Oct. 18, 2022

(54) STUDENT DRIVER MONITORING SYSTEM AND METHOD (71) Applicants: Thomas Simmons, Terre Haute, IN (US); Larry Swank, White House, TN (US)

(72) Inventors: Thomas Simmons, Terre Haute, IN (US); Larry Swank, White House, TN (US)

(73) Assignee: TwentyTwo Six LLC, Terre Haute, IN (US)

( * ) Notice: Subject to any disclaimer, the term of this patent is extended or adjusted under 35 U.S.C. 154(b) by 845 days.

(21) Appl. No.: 16/395,950

(22) Filed: Apr. 26, 2019

(65) Prior Publication Data

US 2019/0333409 A1 Oct. 31, 2019

Related U.S. Application Data (60) Provisional application No. 62/662,859, filed on Apr. 26, 2018.

(51) Int. Cl.
*G09B 19/16* (2006.01)
*G07C 5/08* (2006.01)
(Continued)

(52) U.S. Cl.
CPC .......... *G09B 19/167* (2013.01); *B60R 22/48* (2013.01); *G06F 21/6218* (2013.01);
(Continued)

(58) Field of Classification Search
CPC ...... G09B 19/167; G09B 19/14; B60R 22/48; B60R 2022/4816; G06F 21/6218;
(Continued)

(56) References Cited

U.S. PATENT DOCUMENTS 8,634,816 B2   1/2014  Xiao et al.
9,607,526 B1 * 3/2017  Hsu-Hoffman ...... G09B 19/167
(Continued)

FOREIGN PATENT DOCUMENTS

WO   WO-2018140022 A1 * 8/2018 ............... A61B 5/18

*Primary Examiner* — Ryan W Sherwin
(74) *Attorney, Agent, or Firm* — Taft Stettinius & Hollister LLP; Ryan O. White; Anthony P. Filomena, II (57) ABSTRACT A method and system for student driver monitoring which includes configuring student and instructor devices. For each driving session, configuring at least one the student and instructor devices for pairing the devices; generating a driving session log; monitoring continued pairing of the devices; and uploading the driving session log to a driver training database. The method also includes enabling authorized access to the database to retrieve training information. Pairing the student and instructor devices requires the student and instructor devices to be within a limited range of one another, or in the same vehicle. Vehicle and camera information can be collected for the session log. A seat belt sensor system can indicate whether the student seatbelt is fastened. An unfastened student seatbelt can prevent pairing of the student and instructor devices. Pairing the student and instructor devices can include confirming authentication information.

20 Claims, 2 Drawing Sheets (51) Int. Cl.
*B60R 22/48* (2006.01)
*G06F 21/62* (2013.01)
*G09B 19/14* (2006.01)
*G07C 5/00* (2006.01)

(52) U.S. Cl.
CPC ............ *G07C 5/008* (2013.01); *G07C 5/0858* (2013.01); *G07C 5/0866* (2013.01); *G09B 19/14* (2013.01); *B60R 2022/4816* (2013.01)

(58) Field of Classification Search
CPC ....... G06F 21/35; G06F 21/445; G07C 5/008; G07C 5/0858; G07C 5/0866
See application file for complete search history.

(56) References Cited

U.S. PATENT DOCUMENTS

| | | | |
|---|---|---|---|
| 9,924,365 B2 | 3/2018 | Caldwell et al. | |
| 10,373,523 B1 * | 8/2019 | Fields | G06Q 50/20 |
| 2006/0078853 A1 * | 4/2006 | Lanktree | G09B 19/167 434/62 |
| 2014/0022920 A1 * | 1/2014 | Dua | H04W 64/003 370/252 |
| 2014/0193781 A1 * | 7/2014 | Sands | G09B 19/167 434/64 |
| 2014/0272810 A1 * | 9/2014 | Fields | G09B 5/125 434/65 |
| 2018/0330558 A1 * | 11/2018 | Park | G07C 5/008 |
| 2021/0233428 A1 * | 7/2021 | Hsu-Hoffman | G09B 19/167 |

* cited by examiner

STUDENT DRIVER MONITORING SYSTEM AND METHOD

CROSS-REFERENCE TO RELATED APPLICATIONS

This application claims the benefit of U.S. Provisional Application Ser. No. 62/662,859, filed on Apr. 26, 2018, entitled "STUDENT DRIVER MONITORING SYSTEM AND METHOD," the disclosure of which is incorporated herein by reference.

FIELD OF THE DISCLOSURE

The present disclosure relates to driver monitoring systems and methods, and in particular to a system and method for monitoring student driver education and vehicle operation.

BACKGROUND

Student driver education and training involves satisfying training requirements set by states and other governmental bodies. These training requirements can vary between regions and can change over time. As part of the training, student drivers are usually required to complete a minimum amount of time driving with an instructor and/or guardian. There may also be requirements that portions of this time driving be split between highway driving and local driving, and/or under different weather conditions. It is important that these requirements be tracked so that the student knows what requirements remain, and can report to the designated licensing authority that the requirements have been met. These tracking and reporting requirements as well as other aspects of the driver training procedure can be burdensome on those involved.

Smartphones and other electronic devices are becoming more common in today's society. These devices typically have GPS receivers, navigation systems, wireless communication, clocks, cameras and various other functionality.

It would be desirable to have a system and method that uses the various features of smartphones or other electronic devices to help alleviate the burden of tracking and reporting requirements as well as other aspects of the driver training procedure.

SUMMARY

A method is disclosed for student driver monitoring using portable electronic devices, where the method includes configuring student devices to be used by a plurality of driving students, and configuring instructor devices to be used by a plurality of driving instructors. For each driving session, configuring at least one of a particular student device and a particular instructor device for wirelessly pairing the particular student and instructor devices at the start of the driving session; generating a driving session log during the driving session; monitoring continued pairing of the particular student and instructor devices during the driving session; and uploading the driving session log for the driving session to a driver training database. The method also includes enabling authorized access to the driver training database to retrieve driver training information. Pairing the particular student and instructor devices requires the particular student device and the particular instructor device to be within a limited range of one another. The particular student device is associated with a particular driving student, and the particular instructor device is associated with a particular driving instructor.

The student driver monitoring method can also include configuring parent/guardian devices to be used by parents and guardians of the driving students. For each driving session with a driving student and a parent/guardian, the method can include configuring at least one of a participating student device and a participating parent/guardian device for wirelessly pairing the participating student and parent/guardian devices at the start of the driving session; generating a driving session log during the driving session; monitoring continued pairing of the participating student and parent/guardian devices during the driving session; and uploading the driving session log for the driving session to the driver training database. Pairing the participating student and parent/guardian devices requires the participating student device and the participating parent/guardian device to be within a limited range of one another. The participating student device is associated with a participating driving student and the participating parent/guardian device is associated with a participating parent/guardian where the participating parent/guardian is a parent or guardian of the participating driving student.

Generating a driving session log can include recording a start time for the driving session; monitoring a driving distance and a driving route during the driving session; and recording an end time for the driving session. Uploading the driving session log can include uploading the start time, the end time, the driving distance and the driving route for the driving session to the driver training database. Monitoring a driving distance and a driving route during the driving session can include activating a Global Positioning System (GPS) in one of the particular student and instructor devices at the start of the driving session; and tracking a position, distance traveled and route taken during the driving session using the GPS. Generating a driving session log can include tracking a location and a time duration of any significant stop during the driving session; and uploading the driving session log can include uploading the location and the time duration of the any significant stops during the driving session to the driver training database. Generating a driving session log can include tracking a type of road being driven on for each leg of the driving session; and tracking weather conditions for the driving session; and uploading the driving session log can include uploading the type of road driven on for each leg of the driving session and the weather conditions during the driving session to the driver training database.

The method can also include generating instructor tracking reports for a selected driving instructor using the driver training database, wherein the selected driving instructor is associated with a selected instructor device. Generating an instructor tracking report for the selected driving instructor can include receiving a date range for the instructor tracking report; searching the driver training database for all driving session logs in the date range where the selected instructor device was paired during for the driving session; determining a session time duration for each driving session log in the date range where the selected instructor device was paired during for the driving session; and adding up the session time durations to calculate a cumulative training time during the date range for the selected driving instructor.

The method can also include configuring at least one of the particular student and instructor devices for communicating with a vehicle during the driving session, where the vehicle is used for the driving session. Monitoring continued pairing of the particular student device and the particular instructor device during the driving session can require the particular student device and the particular instructor device to both be in the vehicle during the driving session. Generating a driving session log can include activating a camera during the driving session; making a video log of at least a portion of the driving session using the camera, and uploading the driving session log can include uploading the video log to the driver training database. The camera can be a dashcam viewing forward out the windshield of the vehicle, a cabin camera viewing the interior of the vehicle; or a device camera integrated into the particular student or instructor device. The method can also include configuring at least one of the particular student and instructor devices for communicating with a seat belt sensor system in the vehicle during the driving session, where the seat belt sensor system indicates whether a seat belt used by the particular driving student is fastened. Generating a driving session log can include monitoring whether the seat belt used by the particular driving student is fastened during the driving session using the seat belt sensor system, and uploading the driving session log can include uploading seat belt information to the driver training database that indicates whether the seat belt used by the particular driving student was fastened during the driving session. The method can also include preventing pairing of the particular student device with the particular instructor device when the seat belt sensor system indicates that the seat belt used by the particular driving student is not fastened. Generating a driving session log can also include monitoring vehicle speed during the driving session; monitoring brake usage during the driving session; and monitoring windshield wiper usage during the driving session. Uploading the driving session log can include uploading the vehicle speed, the brake usage, and the windshield wiper usage during the driving session to the driver training database.

Wirelessly pairing the particular student and particular instructor devices at the start of the driving session can include requiring the particular driving student to enter authentication information into the particular student device to confirm identity of the particular driving student; activating the particular student device after the identity of the particular driving student is successfully confirmed; requiring the particular driving instructor to enter authentication information into the particular instructor device to confirm identity of the particular driving instructor; activating the particular instructor device after the identity of the particular driving instructor is successfully confirmed; the activated particular student device searching for an activated instructor device within the limited range of the student device; the activated particular instructor device searching for an activated student device within the limited range of the instructor device; and pairing the activated particular student device and the activated particular instructor device if they find each other within the limited range.

For each driving session, the method can also include enabling the particular driving instructor to enter instructor feedback; and generating a session report for the driving session, where the session report includes details from the driving session and any instructor feedback.

Enabling authorized access to the driver training database to retrieve driver training information can include providing bureau authentication credentials to appropriate government agencies; and enabling personnel of the appropriate government agencies to access the driver training database using the bureau authentication credentials to review the driver training information.

A student driver monitoring system (SDMS) is disclosed that includes a plurality of SDMS student apps, a plurality of SDMS instructor apps, a driver training database, a participant device interface and a client system interface. The plurality of SDMS student apps are configured for installation on participant electronic devices associated with a plurality of driving students. The plurality of SDMS instructor apps are configured for installation on participant electronic devices associated with a plurality of driving instructors. The participant device interface is configured to wirelessly communicate with participant electronic devices. The client system interface is configured to communicate with client systems and allow authorized access to the driver training database by the client systems. For each driving session of a plurality of driving sessions, a participating student app and a participating instructor app are configured to pair together, cooperatively generate a driving session log for the driving session, and upload the driving session log to the driver training database through the participant device interface. The participating student app is one of the plurality of SDMS student apps, and the participating instructor app is one of the plurality of SDMS instructor apps. At least one of the plurality of SDMS student and instructor apps can include a vehicle interface configured to communicate with vehicle systems in a vehicle used for at least one of the driving sessions; and the driving session log can include vehicle information collected through the vehicle interface. The participating student app can be associated with a participating driving student, and the vehicle interface can be configured to communicate with a seat belt sensor system in the vehicle where the seat belt sensor system indicates whether a seat belt used by the participating driving student is fastened; and the driving session log can include seat belt information from the seat belt sensor system collected through the vehicle interface. At least one of the participating student app and the participating instructor app can be configured to prevent the participating student app to pair with the participating instructor app if the seat belt sensor system indicates that the seat belt used by the participating driving student is not fastened. The vehicle systems can include a camera, and the vehicle interface can be configured to communicate with the camera; and the driving session log can include video information from the camera collected through the vehicle interface.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
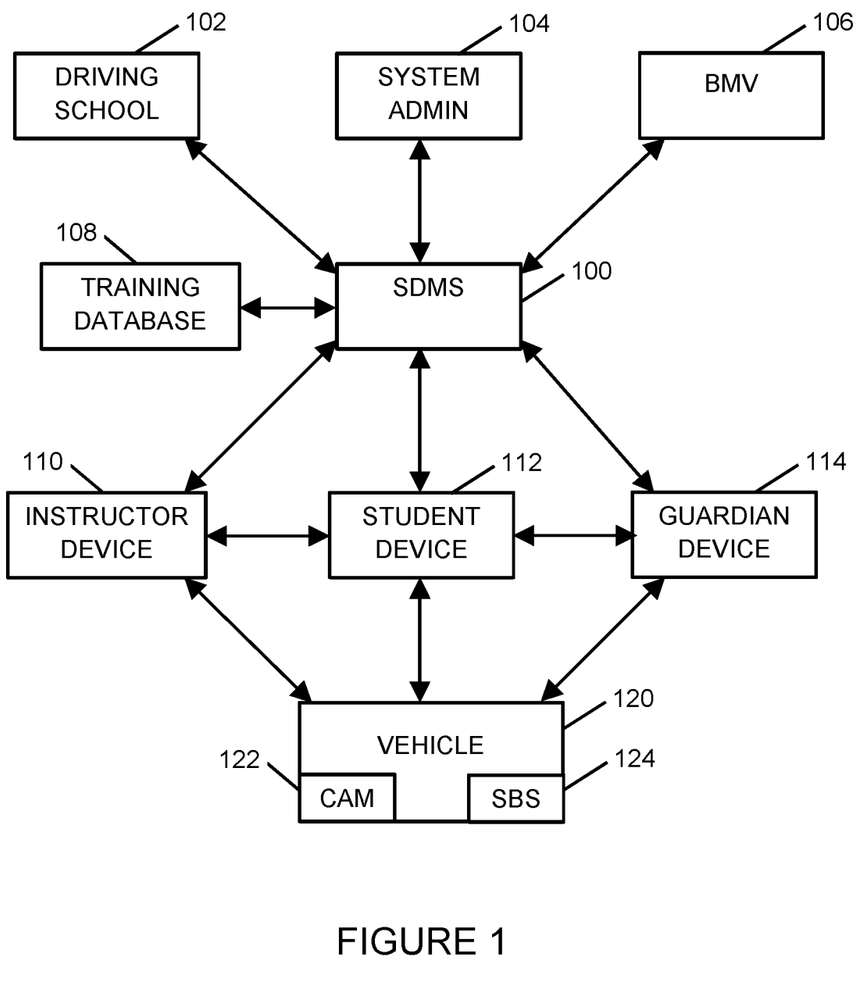
FIG. 1 shows an exemplary set of communication interfaces for a Student Driver Monitoring System.

FIG. 1 shows an exemplary set of communication interfaces for a Student Driver Monitoring System (SDMS) 100. Driving schools 102 communicate with the SDMS to set up and manage their Instructors, students, and guardians (participants), and to track progress and perform other functions. Each school 102 will have a login. School administrators will create accounts for their various participants with login credentials, and these different accounts can be given different privileges for accessing functionality and records of the SDMS 100. The various participants can download a SDMS app for their smartphone or other electronic device 110-114, so they can access their account for logging drive times and other driving information and for performing their own administrative functions. The driving school administrator 102 can track driving logs of each of their students and generate any government regulated forms in electronic or hardcopy format.

SDMS system administrators 104 can communicate with the SDMS 100 to maintain and update the SDMS 100. SDMS system administrators can share in the abilities of each school with access to the data of the SDMS 100. SDMS system administrators 104 can enter and update the various tracking requirements for each locality, as well as associated forms and other parameters for the SDMS 100. SDMS system administrators 104 can setup ads that can be served to the SDMS app on the electronic devices 110-114 of the various users. Ads can be served to users based on their geographic locations and other criteria. Each ad can be tagged with activation and expiration dates for serving the particular ad.

Bureaus of motor vehicles (BMV) 106, or other appropriate government appointed agencies and administrators of driver training, can communicate with the SDMS 100 to check student progress and completion of the necessary driver training requirements. The BMV 106 can be given a similar-level access to the driving schools 102 in their localities. The BMV 106 can access the SDMS 100 to audit training, confirm completion and access any required paperwork for student licensees.

The various participants can access the SDMS 100 using their electronic device 110-114. An instructor device 110, a student device 112 and a guardian device 114 can each be given appropriate system rights by the school 102 and/or the SDMS administrator 104. The participant downloads the SDMS app onto their electronic device 110-114 and it can remain on the device until removed. The participant can access various features of the SDMS 100 through the SDMS app. When a driving session is ready to begin, both the student device 112 and the instructor device 110 or the guardian device 114 is activated and logged into the SDMS app. The student device 112 will confirm proximity of (pair with) an instructor device 110 or a guardian device 114, and the instructor/guardian device 110/114 will pair with the student device 112. The student device 112 and the instructor/guardian device 110/114 will communicate with the SDMS 100 to confirm the initial and continued pairing of the devices, as well as confirm progress during the driving session. One or both of the student device 112 and the instructor/guardian device 110/114 can maintain a driving session log and upload the driving session log to the SDMS 100. The participant devices 110-114 can also communicate with the vehicle 120 and its various systems which can include a camera 122, a seatbelt monitoring system 124, etc. The camera 122 can be a dashcam viewing forward out the windshield of the vehicle 120, and/or a cabin camera viewing the interior and occupants of the vehicle 120 and/or another camera. The camera on one or more of the participant devices 110-114 can also be used for video recording. The seatbelt monitoring system 124 can monitor when the seatbelt is fastened and unfastened by the student, and optionally by other occupants of the vehicle 120.

The school 102, system administrator 104, and BMV 106 (client systems 102-106) each represent different computers or computer systems. The school 102, system administrator 104, and BMV 106 can be connected to the SDMS 100 via various types of wired and wireless networks, such as the Internet. Each of the client systems 102-106 and the SDMS 100 can be local or distributed computer systems. Access to the SDMS 100 allows users of the client systems 102-106 to exchange information, receive and send messages, and view documents. The information, messages and documents can be stored in a driver training database 108 accessible through the SDMS 100.

The instructor device 110, student device 112, and guardian device 114 (participant devices 110-114) each represent different personal electronic devices, for example smartphones, tablets, etc. The participant devices 110-114 can be connected to the SDMS 100 via various wireless networks, for example, cellular, satellite, etc. Access to the SDMS 100 allows users of the participant devices 110-114 to exchange information, receive and send messages, and view documents. The information, messages and documents can be stored in the driver training database 108 accessible through the SDMS 100. The participant devices 110-114 can be connected to the vehicle 120 and its devices 122, 124 via various local wireless methods, for example Bluetooth, Wi-Fi, etc.

Figure 2:
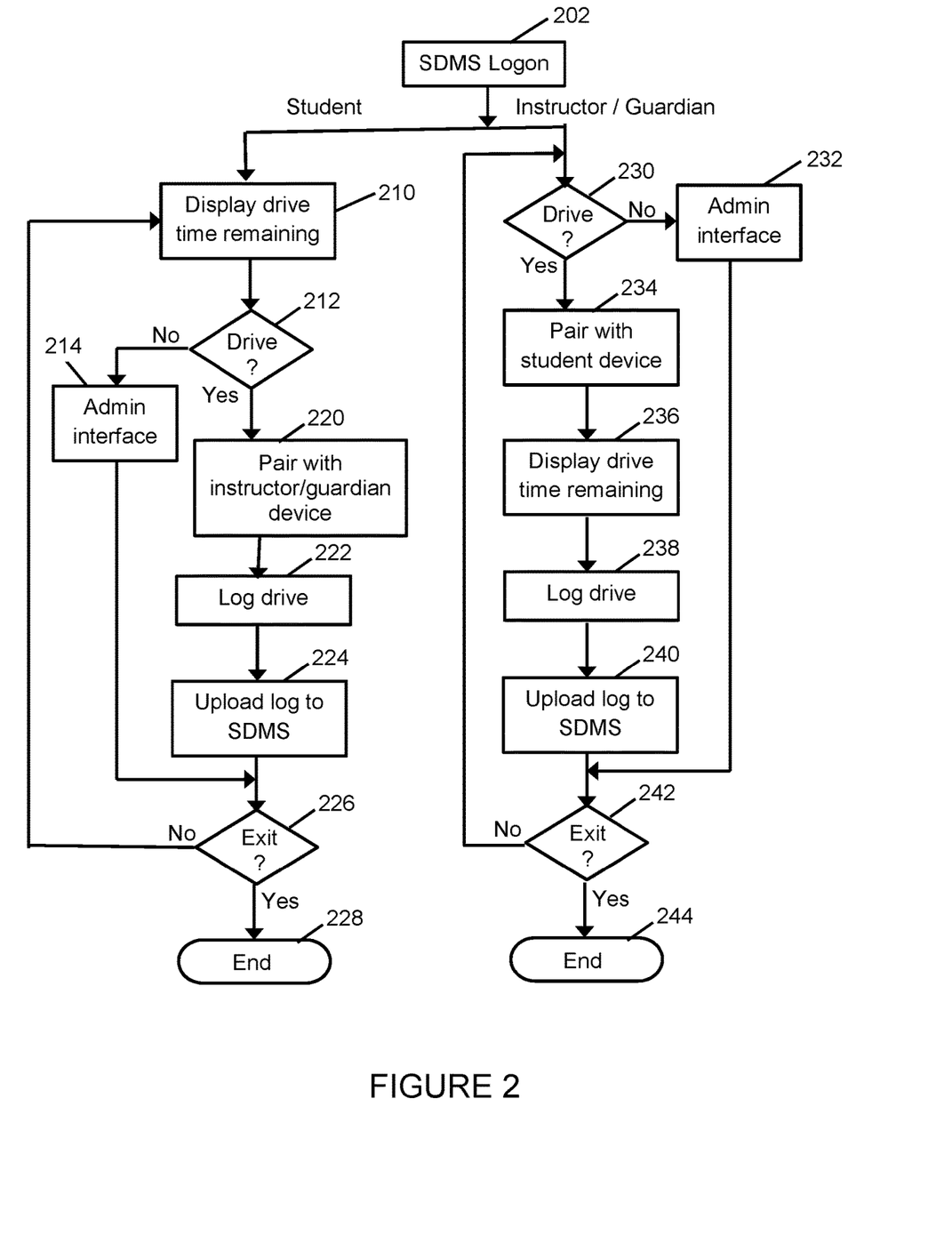
FIG. 2 shows an exemplary flow diagram for a student device and an instructor/guardian device.

FIG. 2 shows an exemplary flow diagram for the SDMS app on a student device 112 and an instructor/guardian device 110/114. At block 202, the participant logs into the SDMS 100 using authentication credentials provided by the school 102. The authentication credentials can include a special code provided by the school 102. Once the participant has signed in the SDMS 100, the SDMS app can be configured to remember their sign in information on that device 110-114. When a participant initially logs into the SDMS 100, they may be required to complete a profile or provide other information for use by the system, Using the authentication credentials, the SDMS app can determine the role of the participant: student, instructor, student guardian. If the participant is a student, control passes to block 210. If the participant is an instructor or a student guardian, control passes to block 230. There can be separate control flows for instructors and guardians, but one shared flow is shown in this exemplary embodiment.

At block 210, for students, the student device 112 displays a countdown timer showing how much time they have left to drive both with an Instructor and with a guardian to meet requirements. At block 212, the student is given the option to initiate a driving session or to perform other functions on their device 112. If the student chooses to initiate a driving session control passes to block 220, and if the student chooses to perform other functions control passes to block 214.

At block 214, the students can perform various administrative functions on their device 112 using the SDMS 100. Some example administrative functions for students can include access to their drive log information, the ability to complete required forms, to update profile information, etc.

At block 230, the instructor/guardian is given the option to initiate a driving session or to perform other functions on their device 110/114. If the instructor/guardian chooses to initiate a driving session control passes to block 234, and if the instructor/guardian chooses to perform other functions control passes to block 232.

At block 232, the instructor/guardian can perform various administrative functions on their device 112 using the SDMS 100. Some example administrative functions for an instructor/guardian can include access to drive log information for students assigned to them, the ability to complete required forms, to update profile information, etc.

At block 220, the student device 112 tries to pair with a nearby instructor/guardian device 110/114. At block 234, the instructor/guardian device 110/114 tries to pair with a nearby student device 112. The pairing can be done with a short-range wireless capability of the devices 110-114, for example Bluetooth communication. Once the devices 110-114 have found a suitable partner, the two devices 110-114 will connect via handshake with the SDMS 100 and the driving session will begin. For the student device 112, control passes to block 222 to log the driving session, and for the instructor/guardian device 110/114, control passes to block 238 to log the driving session. Optionally at block 236, the instructor/guardian device 110/114 can display a countdown timer showing how much time the paired student has left to drive to meet requirements. Alternatively, the instructor/guardian device 110/114, after successful logon at block 202 and before block 230 can display a countdown timer showing how much driving time remains to meet requirements for the last student they drove with.

At block 222 the paired student device 112 logs the driving session, and at block 238 the paired instructor/guardian device 110/114 logs the driving session. Each device 110-114 can log the same or different portions of the driving session. The driving log can include tracking of the drive route and distance via GPS (Global Positioning System) using a GPS sensor and system integrated into one or more of the devices 110-114. The driving log can also include tracking progress points (location and time) during the driving session, recording significant stops (location and time) along the route. The drive log can also include front facing camera footage and cockpit footage using cameras 122 tagged to the drive. The camera or cameras 122 can have wireless connectivity to the paired devices 110-114, so the SDMS app can automatically activate the camera(s) 122 at the beginning of the driving session, deactivate the camera(s) 122 at the end of the driving session, and transfer the video log of the driving session from the camera(s) 122 to the SDMS 100. Alternatively, the SDMS app on one or both of the paired devices 110-114 can automatically activate the camera on the paired device to capture the video log of the driving session, and transfer the video log of the driving session to the SDMS 100. At selected times during the driving session or at its conclusion, the drive log can be uploaded to the SDMS 100. At block 224, the paired student device 112 uploads the drive log to the SDMS 100. At block 240, the paired instructor/guardian device 110/114 uploads the drive log to the SDMS 100. When both participants have ended the drive session, the drive information can be logged by the SDMS 100 for authorized access. When the student ends the drive session, the paired student device 112 proceeds to block 226. When the instructor/guardian ends the drive session, the paired instructor/guardian device 110/114 proceeds to block 242.

At block 226, the student is given the option to exit the SDMS app on the student device 112. If the student chooses to exit the SDMS app control passes to block 228 and the SDMS app closes. If the student chooses not to exit the SDMS app control passes to block 210.

At block 242, the instructor/guardian is given the option to exit the SDMS app on the instructor/guardian device 110/114, If the instructor/guardian chooses to exit the SDMS app control passes to block 244 and the SDMS app closes. If the instructor/guardian chooses not to exit the SDMS app control passes to block 230.

After a driving session, the SDMS app can generate a report of the details of the driving session along with any instructor or guardian feedback, and send (for example via email) the report to the student's guardians and/or instructors. The report can include drive details, for example time, route, distance, etc. The report can also include any questions and answers given by the instructor at the end of the driving session.

The SDMS 100 can enable the school 102 and/or the system administrator 104 to create a driving session record, for example by entering start and end times and driving distance for the driving session, and answering any questions regarding the driving session. This will allow a driving session record to be recorded in the SDMS 100 for a particular driving session, even if the necessary technology (for example participant devices 110-114) were not present during the actual driving session.

Ads can be displayed in the SDMS app on the devices 110-114 in the form of small banner ads that run along the bottom of the main screen, and/or as larger ads that will be shown during logging periods after each drive. Ads can be clickable to take the participant to the advertiser's website:

The driving logs can be accessible by the school 102, BMV 106, system administrator 104, as well as through the SDMS app on devices 110-114. The SDMS 100 can associate portions of the driving route with the type of road (interstate, local, etc.), time of drive (daytime, night time, rush hour, etc.), recorded/predicted weather conditions for area, and other selected criteria. The vehicle 120 can also provide vehicle information, for example speed, braking, windshield wiper usage, etc.

If the camera 122 of the vehicle 120 includes a dashcam, the driving log can include a video record of the drive taken by the dashcam to be archived on the SDMS 100. The same can be done with a cabin camera or with the camera on one of the devices 110-114. For example, a route can be video logged with the video taken from the Instructor's device 110 during the driving session. This video recording functionality can be limited to certain types of participants, for example only activated by instructors. In some embodiments, the SDMS app can automatically activate any of the cameras at the start of a driving session, deactivate the cameras at the end of the driving session, and upload the recorded video log to the SDMS 100.

If the vehicle 120 includes a seatbelt sensor system 124, the driving log can include seatbelt information to be archived on the SDMS 100. The seatbelt sensor system 124 can communicate with nearby devices 110-114 running the SDMS app to indicate whether the student's seatbelt is engaged. If the student's seatbelt is not engaged, the SDMS app on the student device 112 can be configured to prevent the student from pairing with nearby devices 110/114 to start a driving session.

The school 102 can access the SDMS 100 and driver training database 108 to create tracking reports for their instructors. The tracking reports can show cumulative and per-student time driven for a particular instructor during a given time period. The time period can be, for example, a particular day or month, over the lifetime of SDMS 100 usage by the instructor, or other user defined time period.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention.

We claim:

1. A method for student driver monitoring using portable electronic devices, the method comprising:
    configuring a plurality of student devices to be used by a plurality of driving students;
    configuring a plurality of instructor devices to be used by a plurality of driving instructors;
    for each driving session of a plurality of driving sessions with any of the plurality of driving students and any of the plurality of driving instructors, configuring at least one of a particular student device of the plurality of student devices and a particular instructor device of the plurality of instructor devices for:
        wirelessly pairing the particular student device and the particular instructor device at the start of the driving session;
        generating a driving session log during the driving session;
        monitoring continued pairing of the particular student device and the particular instructor device during the driving session; and
        uploading the driving session log for the driving session to a driver training database;
    enabling authorized access to the driver training database to retrieve driver training information;
    wherein pairing the particular student device and the particular instructor device requires the particular student device and the particular instructor device to be within a limited range of one another; and
    wherein the particular student device is associated with a particular driving student of the plurality of driving students and the particular instructor device is associated with a particular driving instructor of the plurality of driving instructors.

2. The method for student driver monitoring of claim 1, further comprising:
    configuring a plurality of parent/guardian devices to be used by a plurality of parents/guardians where each of the plurality of parents/guardians is a parent or guardian of at least one of the plurality of driving students;
    for each driving session of the plurality of driving sessions with any of the plurality of driving students and any of the plurality of parents/guardians, configuring at least one of a participating student device of the plurality of student devices and a participating parent/guardian device of the plurality of parent/guardian devices for:
        wirelessly pairing the participating student device and the participating parent/guardian device at the start of the driving session;
        generating a driving session log during the driving session;
        monitoring continued pairing of the participating student device and the participating parent/guardian device during the driving session; and
        uploading the driving session log for the driving session to the driver training database;
    wherein pairing the participating student device and the participating parent/guardian device requires the participating student device and the participating parent/guardian device to be within a limited range of one another; and
    wherein the participating student device is associated with a participating driving student of the plurality of driving students and the participating parent/guardian device is associated with a participating parent/guardian of the plurality of parents/guardians where the participating parent/guardian is a parent or guardian of the participating driving student.

3. The method for student driver monitoring of claim 1, wherein generating a driving session log comprises:
    recording a start time for the driving session;
    monitoring a driving distance and a driving route during the driving session; and
    recording an end time for the driving session; and
    wherein uploading the driving session log comprises uploading the start time, the end time, the driving distance and the driving route for the driving session to the driver training database.

4. The method for student driver monitoring of claim 3, wherein monitoring a driving distance and a driving route during the driving session comprises:
    activating a Global Positioning System (GPS) in one of the particular student device and the particular instructor device at the start of the driving session; and
    tracking a position, distance traveled and route taken during the driving session using the GPS.

5. The method for student driver monitoring of claim 3, wherein generating a driving session log comprises:
    tracking a location and a time duration of any significant stop during the driving session;
    tracking a type of road being driven on for each leg of the driving session;
    tracking weather conditions for the driving session; and
    wherein uploading the driving session log comprises uploading the location and the time duration of the any significant stops during the driving session, the type of road driven on for each leg of the driving session and the weather conditions during the driving session to the driver training database.

6. The method for student driver monitoring of claim 3, further comprising generating instructor tracking reports for a selected driving instructor of the plurality of driving instructors using the driver training database, wherein the selected driving instructor is associated with a selected instructor device of the plurality of instructor devices, and wherein generating an instructor tracking report for the selected driving instructor comprises:
    receiving a date range for the instructor tracking report;
    searching the driver training database for all driving session logs in the date range where the selected instructor device was paired during for the driving session;
    determining a session time duration for each driving session log in the date range where the selected instructor device was paired during for the driving session; and adding up the session time durations to calculate a cumulative training time during the date range for the selected driving instructor.

7. The method for student driver monitoring of claim 1, further comprising:
configuring at least one of the particular student device and the particular instructor device for communicating with a vehicle during the driving session, the vehicle being used for the driving session; and
wherein monitoring continued pairing of the particular student device and the particular instructor device during the driving session requires the particular student device and the particular instructor device to both be in the vehicle during the driving session.

8. The method for student driver monitoring of claim 7, wherein generating a driving session log comprises:
activating a camera during the driving session;
making a video log of at least a portion of the driving session using the camera, and
wherein uploading the driving session log comprises uploading the video log to the driver training database.

9. The method for student driver monitoring of claim 8, wherein the camera is a dashcam viewing forward out the windshield of the vehicle.

10. The method for student driver monitoring of claim 7, further comprising:
configuring at least one of the particular student device and the particular instructor device for communicating with a seat belt sensor system in the vehicle during the driving session, the seat belt sensor system indicating whether a seat belt used by the particular driving student is fastened;
wherein generating a driving session log comprises monitoring whether the seat belt used by the particular driving student is fastened during the driving session using the seat belt sensor system, and
wherein uploading the driving session log comprises uploading seat belt information to the driver training database that indicates whether the seat belt used by the particular driving student was fastened during the driving session.

11. The method for student driver monitoring of claim 7, further comprising:
configuring at least one of the particular student device and the particular instructor device for communicating with a seat belt sensor system in the vehicle, the seat belt sensor system indicating whether a seat belt used by the particular driving student is fastened; and
preventing pairing of the particular student device with the particular instructor device when the seat belt sensor system indicates that the seat belt used by the particular driving student is not fastened.

12. The method for student driver monitoring of claim 7, wherein generating a driving session log comprises:
monitoring vehicle speed during the driving session;
monitoring brake usage during the driving session; and
monitoring windshield wiper usage during the driving session; and
wherein uploading the driving session log comprises uploading the vehicle speed, the brake usage, and the windshield wiper usage during the driving session to the driver training database.

13. The method for student driver monitoring of claim 1, wherein wirelessly pairing the particular student device and the particular instructor device at the start of the driving session comprises:

requiring the particular driving student to enter authentication information into the particular student device to confirm identity of the particular driving student;
activating the particular student device after the identity of the particular driving student is successfully confirmed;
requiring the particular driving instructor to enter authentication information into the particular instructor device to confirm identity of the particular driving instructor;
activating the particular instructor device after the identity of the particular driving instructor is successfully confirmed;
the activated particular student device searching for an activated instructor device within the limited range of the student device;
the activated particular instructor device searching for an activated student device within the limited range of the instructor device; and
pairing the activated particular student device and the activated particular instructor device if they find each other within the limited range.

14. The method for student driver monitoring of claim 1, further comprising for each driving session:
enabling the particular driving instructor to enter instructor feedback; and
generating a session report for the driving session, the session report including details from the driving session and any instructor feedback.

15. The method for student driver monitoring of claim 1, wherein enabling authorized access to the driver training database to retrieve driver training information comprises:
providing bureau authentication credentials to appropriate government agencies; and
enabling personnel of the appropriate government agencies to access the driver training database using the bureau authentication credentials to review the driver training information.

16. A student driver monitoring system (SDMS) comprising:
a plurality of SDMS student apps configured for installation on participant electronic devices associated with a plurality of driving students;
a plurality of SDMS instructor apps configured for installation on participant electronic devices associated with a plurality of driving instructors;
a driver training database;
a participant device interface configured to wirelessly communicate with participant electronic devices;
a client system interface configured to communicate with client systems and allow authorized access to the driver training database by the client systems;
wherein for each driving session of a plurality of driving sessions, a participating student app and a participating instructor app are configured to pair together, cooperatively generate a driving session log for the driving session, and upload the driving session log to the driver training database through the participant device interface, where the participating student app is one of the plurality of SDMS student apps and the participating instructor app is one of the plurality of SDMS instructor apps.

17. The student driver monitoring system (SDMS) of claim 16, wherein at least one of the plurality of SDMS student and instructor apps comprises a vehicle interface configured to communicate with vehicle systems in a vehicle used for at least one of the plurality of driving sessions; and wherein the driving session log includes vehicle information collected through the vehicle interface.

18. The student driver monitoring system (SDMS) of claim 17, wherein the participating student app is associated with a participating driving student, and
wherein the vehicle interface is configured to communicate with a seat belt sensor system in the vehicle where the seat belt sensor system indicates whether a seat belt used by the participating driving student is fastened; and
wherein the driving session log includes seat belt information from the seat belt sensor system collected through the vehicle interface.

19. The student driver monitoring system (SDMS) of claim 18, wherein at least one of the participating student app and the participating instructor app is configured to prevent the participating student app to pair with the participating instructor app if the seat belt sensor system indicates that the seat belt used by the participating driving student is not fastened.

20. The student driver monitoring system (SDMS) of claim 17, wherein the vehicle systems include a camera; and
wherein the vehicle interface is configured to communicate with the camera; and
wherein the driving session log includes video information from the camera collected through the vehicle interface.

* * * * *